United States Patent
Oh et al.

(10) Patent No.: US 11,581,578 B2
(45) Date of Patent: Feb. 14, 2023

(54) COMPOSITION FOR GEL POLYMER ELECTROLYTE INCLUDING SILOXANE OLIGOMER AND STYRENE-BASED OLIGOMER, GEL POLYMER ELECTROLYTE PREPARED THEREFROM, AND LITHIUM SECONDARY BATTERY INCLUDING THE SAME

(71) Applicant: LG Chem, Ltd., Seoul (KR)

(72) Inventors: Jeong Woo Oh, Daejeon (KR); Kyoung Ho Ahn, Daejeon (KR); Chul Haeng Lee, Daejeon (KR); Jung Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 399 days.

(21) Appl. No.: 16/638,701

(22) PCT Filed: Nov. 30, 2018

(86) PCT No.: PCT/KR2018/015108
§ 371 (c)(1),
(2) Date: Feb. 12, 2020

(87) PCT Pub. No.: WO2019/108024
PCT Pub. Date: Jun. 6, 2019

(65) Prior Publication Data
US 2020/0220211 A1 Jul. 9, 2020

(30) Foreign Application Priority Data
Nov. 30, 2017 (KR) .................. 10-2017-0163677

(51) Int. Cl.
H01M 10/0565 (2010.01)
C08L 25/12 (2006.01)
C08L 83/06 (2006.01)
H01M 10/0525 (2010.01)

(52) U.S. Cl.
CPC ......... *H01M 10/0565* (2013.01); *C08L 25/12* (2013.01); *C08L 83/06* (2013.01); *H01M 10/0525* (2013.01); *H01M 2300/0085* (2013.01)

(58) Field of Classification Search
CPC ...... H01M 10/0565; C08L 25/12; C08L 83/06
USPC ........................................ 429/300, 302, 303
See application file for complete search history.

(56) References Cited

U.S. PATENT DOCUMENTS

| | | | |
|---|---|---|---|
| 10,243,239 B1 * | 3/2019 | Ahn | H01M 10/0569 |
| 2005/0089759 A1 | 4/2005 | Hwang et al. | |
| 2012/0015255 A1 | 1/2012 | Hwang et al. | |
| 2014/0255792 A1 | 9/2014 | Cao et al. | |
| 2015/0011671 A1 | 1/2015 | Saxena et al. | |
| 2015/0011788 A1 | 1/2015 | Saxena et al. | |
| 2015/0221980 A1 | 8/2015 | Hillmyer et al. | |
| 2015/0280277 A1 | 10/2015 | Fleischmann et al. | |
| 2016/0043435 A1 | 2/2016 | DeSimone | |
| 2016/0093916 A1 | 3/2016 | Moon et al. | |
| 2017/0092984 A1 | 3/2017 | Park et al. | |
| 2017/0110759 A1 | 4/2017 | Boeckmann et al. | |
| 2017/0229735 A1 * | 8/2017 | Ahn | H01M 10/0567 |
| 2017/0309956 A1 | 10/2017 | Park et al. | |

FOREIGN PATENT DOCUMENTS

| | | | | |
|---|---|---|---|---|
| CN | 104558390 A | * | 4/2015 | |
| CN | 105518058 A | | 4/2016 | |
| CN | 106058311 A | | 10/2016 | |
| CN | 106165179 A | | 11/2016 | |
| CN | 106711506 A | | 5/2017 | |
| CN | 106797048 A | | 5/2017 | |
| CN | 106797053 A | | 5/2017 | |
| CN | 107078342 A | | 8/2017 | |
| EP | 3203565 A1 | | 8/2017 | |
| JP | 2014-013659 A | | 1/2014 | |
| JP | 2015-522932 A | | 8/2015 | |
| KR | 10-2005-0038905 A | | 4/2005 | |
| KR | 10-2014-0097252 A | | 8/2014 | |
| KR | 10-2015-0139827 A | | 12/2015 | |
| KR | 10-2016-0040128 A | | 4/2016 | |
| KR | 10-2016-0137623 A | | 11/2016 | |
| KR | 10-2017-0007850 A | | 1/2017 | |
| KR | 10-2017-0037805 A | | 4/2017 | |
| WO | WO-2016053064 A1 | * | 4/2016 | ...... H01M 10/052 |

OTHER PUBLICATIONS

Oh et al., Poly(vinylpyridine-co-styrene) based in situ cross-linked gel polymer electrolyte for lithium-ion polymer batteries, May 2011, Electrochimica Acta, 57, 46-51 (Year: 2011).*
Extended European Search Report issued from the European Patent Office dated Jun. 9, 2020 in the corresponding European patent application No. 18884816.2.
Digar, M. et al., "Blending Poly(methyl methacrylate) and Poly(styrene-co-acrylonitrile) as Composite Polymer Electrolyte", Jrl. of Applied Polymer Science, vol. 80, 1319-1328 (2001).

* cited by examiner

*Primary Examiner* — Sean P Cullen
(74) *Attorney, Agent, or Firm* — Morgan, Lewis & Bockius LLP

(57) ABSTRACT

The present invention provides a composition for a gel polymer electrolyte, the composition including a first oligomer represented by Formula 1, a second oligomer including a first repeating unit represented by Formula 2a derived from a styrene monomer, a polymerization initiator, a lithium salt, and a non-aqueous solvent. The present invention also provides a gel polymer electrolyte prepared using the same, and a lithium secondary battery.

17 Claims, No Drawings

COMPOSITION FOR GEL POLYMER ELECTROLYTE INCLUDING SILOXANE OLIGOMER AND STYRENE-BASED OLIGOMER, GEL POLYMER ELECTROLYTE PREPARED THEREFROM, AND LITHIUM SECONDARY BATTERY INCLUDING THE SAME

CROSS-REFERENCE TO RELATED APPLICATIONS

This application claims the benefit of Korean Patent Application No. 10-2017-0163677, filed on Nov. 30, 2017, the disclosure of which is incorporated herein in its entirety by reference.

TECHNICAL FIELD

The present invention relates to a composition for a gel polymer electrolyte, a gel polymer electrolyte prepared therefrom, and lithium secondary battery including the same, and more particularly, to a composition for a gel polymer electrolyte having improved high-temperature stability, a gel polymer electrolyte prepared therefrom, and a lithium secondary battery including the same.

BACKGROUND ART

Demands for secondary batteries as an energy source have been significantly increased as technology development of and demands for mobile devices have increased, and among such secondary batteries, lithium secondary batteries having high energy density and voltage have been commercialized and widely used.

A lithium secondary battery is produced by a process in which an electrode assembly is prepared by coating current collectors with a positive electrode active material and a negative electrode active material to appropriate thicknesses or forming an active material itself to have a film shape having an appropriate length, and then winding or laminating the resultant product together with an insulating separator, the electrode assembly is accommodated into a can or a container similar thereto, and an electrolyte is then injected into the can or container.

A lithium metal oxide is used as the positive electrode active material, and a lithium metal, a lithium alloy, crystalline or amorphous carbon, or a carbon composite is used as the negative electrode active material. In addition, a liquid electrolyte, particularly, an ion conductive liquid electrolyte in which a salt is dissolved in a non-aqueous organic solvent, has been generally used, as the electrolyte.

However, recently, as interests in energy storage technologies have been increasingly grown, there is a need to develop a secondary battery which is capable of charging and discharging with a compact size, a light weight, and high-capacity performances, as well as having high-temperature and high-voltage safety.

Meanwhile, when a secondary battery is driven at high temperature under high voltage, an exothermic phenomenon may frequently occur in the lithium secondary battery due to the increase in internal temperature. Thus, there is a problem that a liquid electrolyte consisting only of an organic solvent and a salt typically has a low high-temperature safety, and once ignition is initiated, combustion is spontaneously proceeded even if a supply of electric current from the outside is cut off.

To solve the problem, there is a need to develop a battery using a gel polymer electrolyte which has high-temperature safety by itself unlike a liquid electrolyte.

(Patent document 0001) Korean Patent Application Laid-open Publication No. 10-2015-0139827

DISCLOSURE OF THE INVENTION

Technical Problem

To solve the above-described problem, the present invention provides a composition for a gel polymer electrolyte, a gel polymer electrolyte prepared therefrom, and a lithium secondary battery including the same, the composition capable of improving high-temperature safety of a battery without deteriorating a battery performance.

Technical Solution

In an aspect, the present invention provides a composition for a gel polymer electrolyte including a first oligomer represented by Formula 1 below;

a second oligomer including a first repeating unit which is represented by Formula 2a below and derived from a styrene monomer;

a polymerization initiator; a lithium salt; and a non-aqueous solvent.

[Formula 1]

In Formula 1,

A and A' are each independently a unit including a (meth)acrylate group,

B and B' are each independently a unit including an amide group,

C and C' are each independently including a unit an oxyalkylene group,

D is a unit including a siloxane group, and k is an integer of 1 to 100.

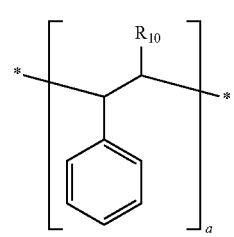

[Formula 2a]

In Formula 2a, $R_{10}$ is one selected from the group consisting of hydrogen and a substituted or unsubstituted alkyl group having 1 to 5 carbon atoms, and a is an integer of 1 to 50.

Meanwhile, the second oligomer may further include at least one selected from the group consisting of a second repeating unit represented by Formula 2b below and and a third repeating unit represented by Formula 2c below.

[Formula 2b]

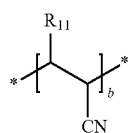

In Formula 2b, $R_{11}$ is one selected from the group consisting of hydrogen and a substituted or unsubstituted alkyl group having 1 to 5 carbon atoms, and b is an integer of 1 to 50.

[Formula 2c]

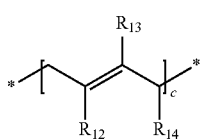

In Formula 2c, $R_{12}$, $R_{13}$, and $R_{14}$ are each independently one selected from the group consisting of hydrogen and a substituted or unsubstituted alkyl group having 1 to 5 carbon atoms, and c is an integer of 1 to 50.

According to an embodiment of the present invention, the second oligomer may include one selected from the group consisting of units represented by Formulae 2-1 and 2-2 below.

[Formula 2-1]

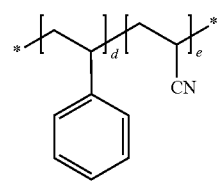

In Formula 2-1, d and e are each independently an integer of 1 to 50.

[Formula 2-2]

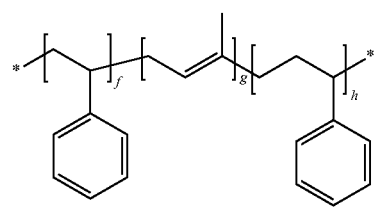

In Formula 2-2, f, g, and h are each independently an integer of 1 to 50.

In addition, the first oligomer may include at least one compound selected from the group consisting of compounds represented by Formulae 1-1 to 1-5.

[Formula 1-1]

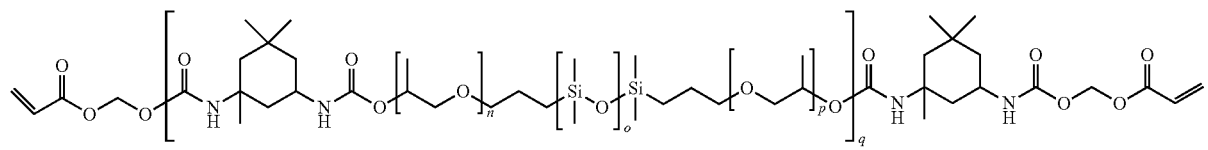

[Formula 1-2]

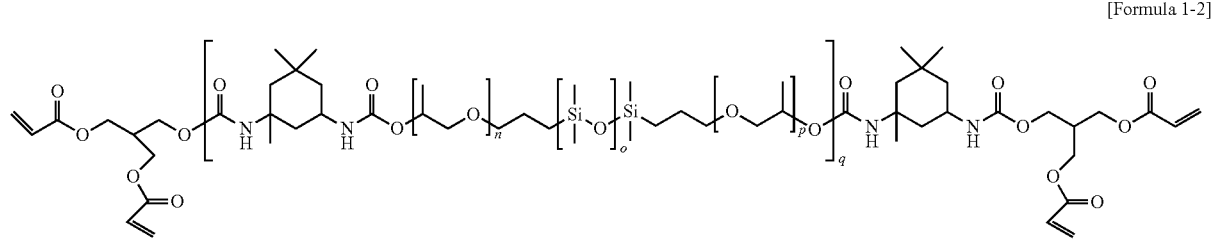

[Formula 1-3]

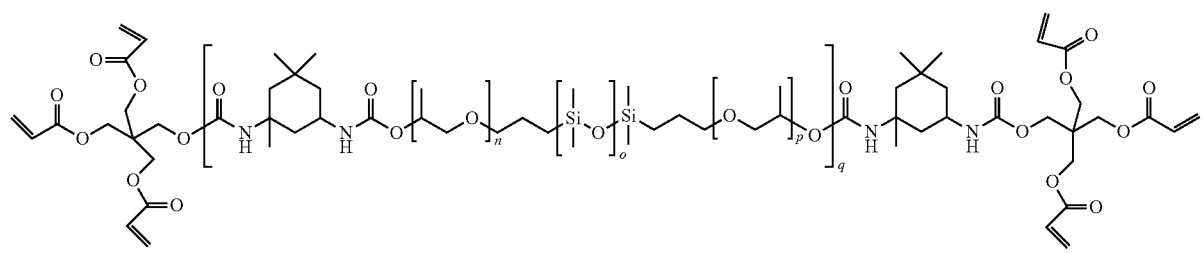

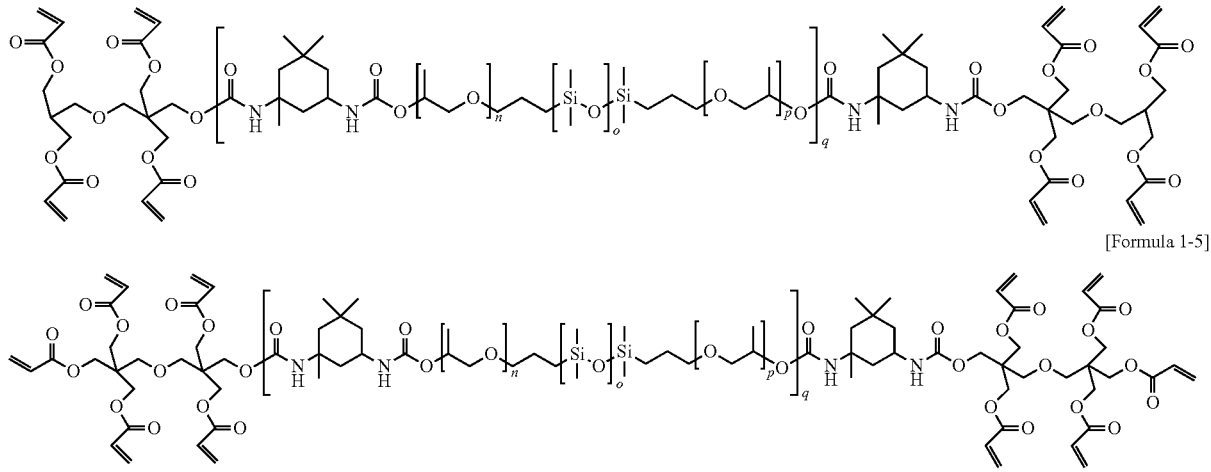

[Formula 1-4]

[Formula 1-5]

In Formulae 1-1 to 1-5, n, o, and p are each independently an integer of 1 to 30, and q is an integer of 1 to 100.

In another aspect, the present invention provides a gel polymer electrolyte prepared by using the composition for a gel polymer electrolyte and a lithium secondary battery including the same.

Advantageous Effects

The composition for a gel polymer electrolyte according to the present invention uses a polymer network formed by mixing two or more types of oligomers having excellent electrochemical safety, thereby improving the high-temperature safety of a lithium secondary battery.

BEST MODE FOR CARRYING OUT THE INVENTION

Hereinafter, the present invention will be described in more detail for understanding of the present invention.

It will be understood that terms or words used in the description and claims should not be construed as a general or dictionary definition but are to be construed as a meaning and concept that accord with the technical spirits of the present invention based on a principle that the inventors may properly define the concepts of terms in order to describe their own invention in best mode.

The terms used herein is for the purpose of describing exemplary embodiments only and is not intended to be limiting of the present invention. The singular expressions include the plural expressions, unless the context clearly means otherwise.

It will be understood that the terms "include", "provided with" or "have" when used in the description, specify the presence of stated features, numerals, steps, elements, or the combination thereof, but do not preclude the presence or addition of one or more other features, numerals, steps, elements, or the combination thereof.

Meanwhile, "*" used in the description means a connected part between the same or different atoms or between the terminal parts of a formula unless otherwise indicated herein.

Composition for Gel Polymer Electrolyte

The composition for a gel polymer electrolyte according to the present invention includes a first oligomer; a second oligomer; a polymerization initiator; a lithium salt; and a non-aqueous solvent.

Oligomer

First, the oligomer will be explained. As described above, the oligomer of the present invention is composed of a first oligomer and a second oligomer.

The first and second oligomers may be three-dimensionally combined to form a polymer network through polymerization reaction, the first oligomer includes a (meth)acrylate group, an amide group, an oxyalkylene group, and a siloxane group, and the second oligomer includes a first repeating unit derived from a styrene monomer.

According to types of an electrolyte used, a lithium secondary battery may be classified into a lithium secondary battery using a liquid electrolyte, and lithium polymer battery using a polymer electrolyte.

However, when a liquid electrolyte is used, it is highly likely to degrade an electrode material and volatilize an organic solvent, and also there is a problem in high-temperature safety because ignition reaction may be caused by increases in ambient temperature and temperature of the battery itself. In particular, a thermal runaway phenomenon may occur when a liquid electrolyte exceeds the flash point due to overheating. The thermal runaway phenomenon is known to occur in a high-temperature situation where a liquid electrolyte acts as a fuel such as oil in high-current, overcharging, and high-temperature environments and chemically reacts with oxygen released from the positive electrode active material.

To solve such a problem, a protection circuit for current breaking, a safety exhaust outlet may be used when a battery is overheated over a particular temperature, the above-mentioned devices are relatively expensive thereby leading to the burden of price.

Therefore, the present invention uses a gel polymer electrolyte including a polymer network formed by three-dimensionally combining the first and second oligomers in order to solve such problems. A gel polymer electrolyte formed by combining the first and second oligomers has a lower volatility even at high temperature than a liquid electrolyte, and thus exhibits high electrochemical stability. In addition, when first and second oligomers of different types are used together as the co-oligomer, the modulus of a gel polymer electrolyte structure may be improved due to the second oligomer while maintaining the electrochemical stability due to the first oligomer having the electrochemically stable structure.

In addition, when two types of oligomers having different molecular weights are mixed, the polymer network may be rapidly formed, to allow the conversion rate from the oligomer to the polymer to be also improved.

Meanwhile, the safety of the battery may be improved by suppressing the electrochemical reaction at an interface between the gel polymer electrolyte and a positive electrode, and an amount of gas generated by the electrochemical reaction during high-temperature storage is reduced, and therefore, high-temperature safety may also be improved.

Meanwhile, the first oligomer and the second oligomer may be included at a mass ratio of 97.5:2.5 to 2.5:97.5, preferably 70:30 to 30:70, and more preferably 40:60 to 60:40. When the first and second oligomers are included in the above-mentioned mass ratio, the electrochemical stability, modulus, and high-temperature storage durability of the gel polymer formed by the oligomers may be improved.

In particular, the first oligomer is represented by Formula 1 below.

[Formula 1]

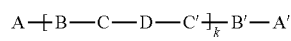

In Formula 1,
Each of A and A' is independently a unit including a (meth)acrylate group, each of B and B' is independently a unit including an amide group, each of C and C' is independently a unit including an oxyalkylene group, D is a unit including a siloxane group, and k is an integer of 1 to 100.

Meanwhile, k may preferably be an integer of 1 to 50, and more preferably an integer of 1 to 30. When k is in this range, the oligomer represented by Formula 1 has a suitable weight-averaged molecular weight (Mw).

A weight-averaged molecular weight herein may mean a conversion value in terms of standard polystyrene as measured by gel permeation chromatograph (GPC), and unless otherwise specified, a molecular weight may mean a weight-averaged molecular weight. The weight-averaged molecular weight may be measured by gel permeation chromatograph (GPC). For example, a sample specimen with a certain concentration is prepared, and subsequently, a GPC measurement system alliance 4 instrument is stabilized. Once the instrument is stabilized, a standard specimen and a sample specimen are injected into the instrument to obtain chromatogram, and then the weight-averaged molecular weight is calculated (system: Alliance 4, column: Ultrahydrogel linear×2, eluent: 0.1M NaNO$_3$ (pH 7.0 phosphate buffer, flow rate: 0.1 mL/min, temp: 40° C., injection: 100 μL)

The weight-averaged molecular weight (Mw) of a first oligomer represented by Formula 1 may be controlled by the number of repeating units, and may be 1,000 to 20,000, particularly 1,000 to 15,000, and more particularly 1,000 to 10,000. When the weight-averaged molecular weight of the first oligomer is within the above range, it is possible to prepare a gel polymer electrolyte which has low volatility, effectively improves the mechanical strength of a battery including the same, and improves the processability (formability) and high-temperature stability or the like of the battery.

Meanwhile, the units A and A' are units including a (meth)acrylate group such that oligomers are combined into a three-dimensional structure to form a polymer network. The units A and A' may be derived from a monomer that includes, within a molecular structure, at least one monofunctional or polyfunctional (meth)acrylate or (meth)acrylic acid.

For example, the units A and A' may each independently include at least one unit represented by Formulae A-1 to A-5 below.

[Formula A-1]

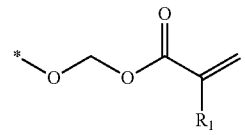

[Formula A-2]

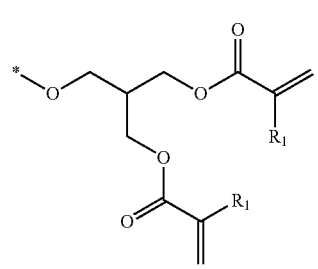

[Formula A-3]

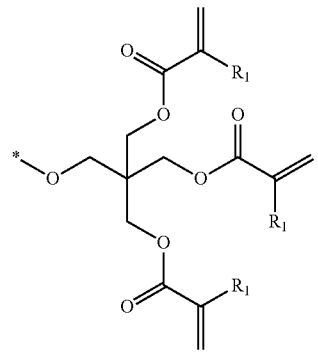

[Formula A-4]

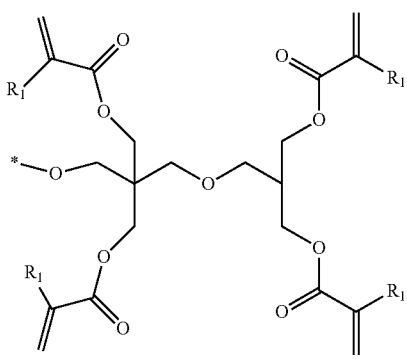

[Formula A-5]

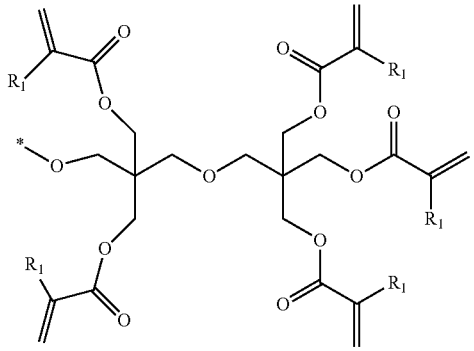

In Formulae A-1 to A-5, $R_1$ may each independently be one selected from the group consisting of hydrogen and a substituted or unsubstituted alkyl group having 1 to 6 carbon atoms.

In addition, the units B and B' are each independently a unit including an amide group and are used for controlling ion transfer properties and imparting mechanical properties and adhesion in order to accomplish a gel polymer electrolyte using the first oligomer.

For example, the units B and B' may each independently include a unit represented by Formula B-1 below.

[Formula B-1]

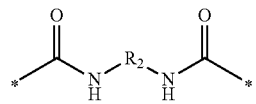

In Formula B-1, $R_2$ is at least one selected from the group consisting of a linear or nonlinear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted aryl group having 6 to 20 carbon atoms, a unit represented by Formula $R_2$-1 below, and a unit represented by Formula $R_2$-2 below.

[Formula $R_2$-1]

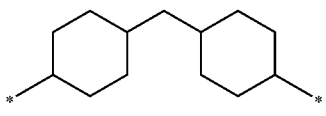

[Formula $R_2$-2]

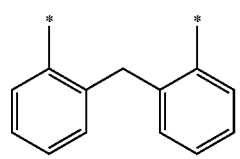

As another example, in Formula B-1, $R_2$ may include at least one unit represented by Formulae $R_2$-3 to $R_2$-8 below.

[Formula $R_2$-3]

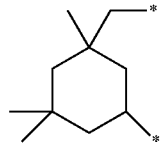

[Formula $R_2$-4]

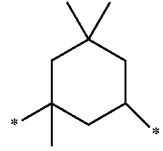

[Formula $R_2$-5]

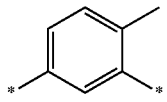

[Formula $R_2$-6]

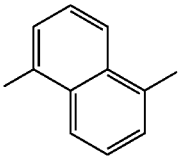

[Formula $R_2$-7]

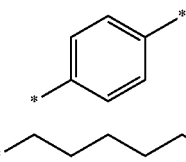

[Formula $R_2$-8]

*~~~~~*

In addition, each of the units C and C' is independently a unit including an oxyalkylene group to dissociate salts in the polymer network and to increase affinity with a surface having high polarity in a battery. More specifically, the units C and C' are used for controlling impregnability of a solvent, electrode affinity, and ion transfer capacity.

The units C and C' may each independently include a unit represented by Formula C-1 below.

[Formula C-1]

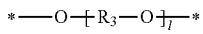

In Formula C-1, $R_3$ is a substituted or unsubstituted, linear or nonlinear alkylene group having 1 to 10 carbon atoms, and l is an integer of 1 to 30.

Specifically, in Formula C-1, $R_3$ may be —$CH_2CH_2$— or —$CHCH_3CH_2$—.

The unit D is a unit including a siloxane group for controlling mechanical properties and affinity with separator.

Specifically, it is possible to form a structure for securing flexibility besides a rigid structure region achieved by an amide bond in a polymer network, and to improve the affinity with a polyolefin-based separator fabric using the low polarity. In particular, when the affinity with the polyolefin-based separator fabric is improved, an effect of further improving an ionic conductivity due to a decrease of resistance may be achieved as well.

In addition, since a Si element included in the D unit is an inert element which is not reactive with oxygen in the air and a lithium metal, a side reaction such as lithium metal precipitation or oxygen radical emission due to collapsing of a positive electrode structure does not occur. In addition, lithium precipitation may be suppressed by improving the wetting in a battery, and an exothermic reaction may also be controlled by suppressing a chemical reaction with lithium dendrite.

For example, the unit D may include a unit represented by Formula D-1.

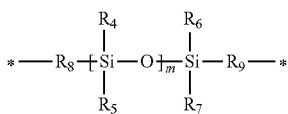

[Formula D-1]

In Formula D-1, $R_8$ and $R_9$ are a linear or nonlinear alkylene group having 1 to 5 carbon atoms, $R_4$, $R_5$, $R_6$ and $R_7$ are each independently hydrogen, an alkyl group having 1 to 5 carbon atoms or an aryl group having 6 to 12 carbon atoms, and m is an integer of 1 to 500. Meanwhile, m may be more preferably an integer of 10 to 500.

Specifically, the unit D represented by the Formula D-1 may be a unit represented by Formula D-2 below.

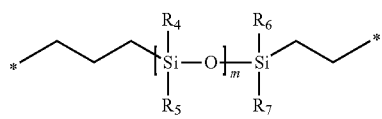

[Formula D-2]

In Formula D-2, $R_4$, $R_5$, $R_6$ and $R_7$ are each independently hydrogen, an alkyl group having 1 to 5 carbon atoms or an aryl group having 6 to 12 carbon atoms, and in Formula D-2, m may be an integer of 1 to 500, more preferably an integer of 10 to 500.

More specifically, the unit D represented by the Formula D-2 may be one among the units represented by Formulae D-3 and D-4 below.

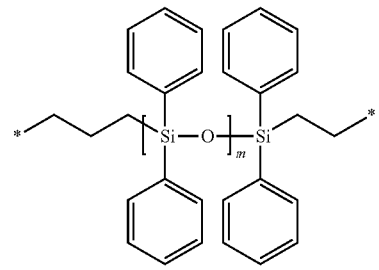

[Formula D-3]

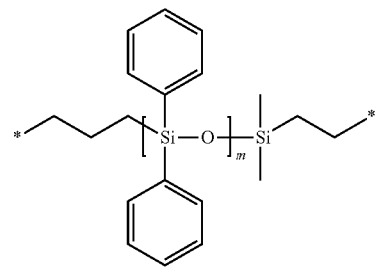

[Formula D-4]

In Formula D-3 and Formula D-4, m is independently an integer of 1 to 500. More preferably m may be an integer of 10 to 500. When m satisfies the above-mentioned range, Si and benzene of a gel polymer electrolyte prepared using an oligomer containing the unit are substituted, to further improve high-temperature safety, and to control a chemical reaction with a lithium metal electrode, thereby improving the stability of the battery.

According to an embodiment of the present invention, the first oligomer may include at least one compound selected from the group consisting of units represented by Formulae 1-1 to 1-5 below.

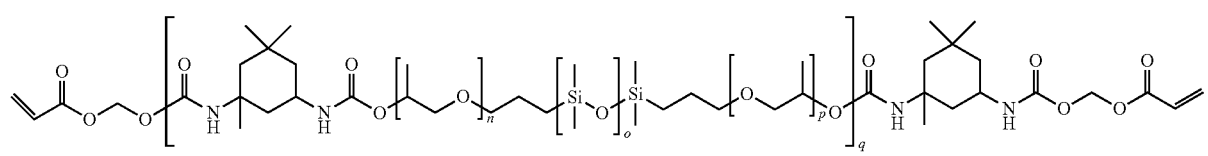

[Formula 1-1]

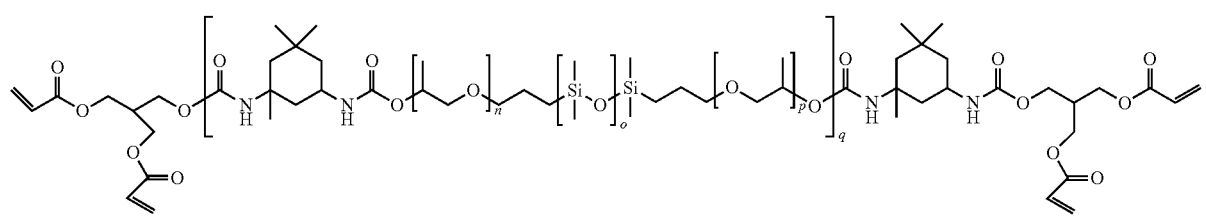

[Formula 1-2]

[Formula 1-3]

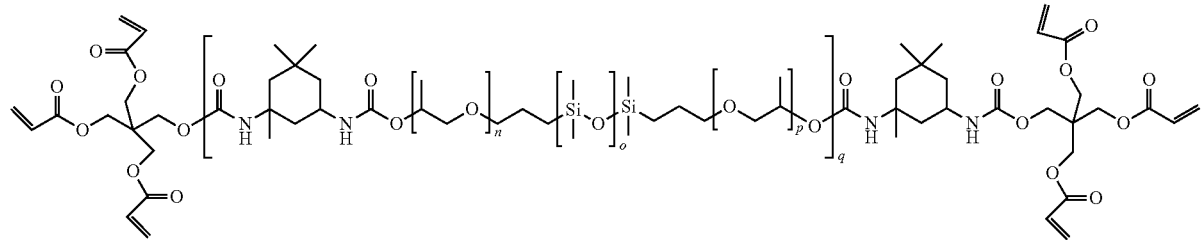

[Formula 1-4]

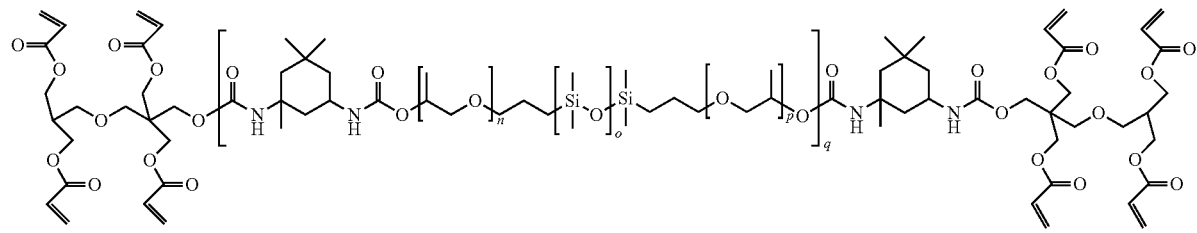

[Formula 1-5]

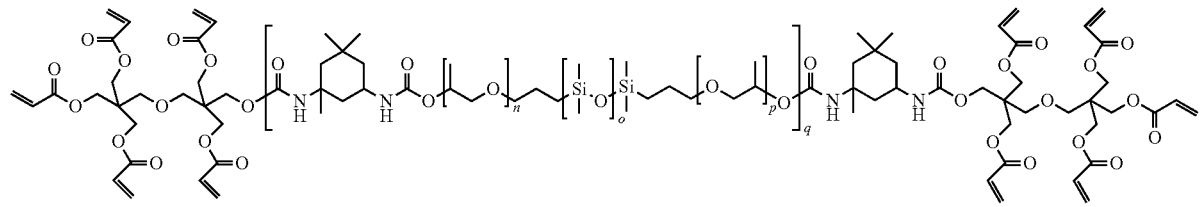

In Formulae 1-1 to 1-5, n, o, and p are each independently an integer of 1 to 30, and q is an integer of 1 to 100.

Meanwhile, q may preferably be an integer of 1 to 50, and more preferably an integer of 1 to 30.

Meanwhile, with respect to 100 parts by weight of a composition for a gel polymer electrolyte, the first oligomer may be included in an amount of 0.5 to 20 parts by weight, preferably 1.0 to 20 parts by weight, and more preferably 1.5 to 20 parts by weight. When the content of the first oligomer is less than 0.5 parts by weight, a network reaction between the first oligomers or with the second oligomer for forming the gel polymer electrolyte may be difficult to be formed; and when the content of the first oligomer is greater than 20 parts by weight, the viscosity of the gel polymer electrolyte exceeds a certain level, and therefore, the impregnability, wetting property, and electrochemical stability of the battery may be degraded.

The second oligomer may include a first repeating unit which is represented by Formula 2a below and derived from a styrene monomer. A first repeating unit derived from a styrene monomer includes benzene having a resonance structure, and when a radical is formed by the resonance structure, the benzene acts as a radical scavenger to stabilize and fix a radical compound, to suppress an ignition phenomenon induced by the oxygen radical, thereby improving the high-temperature safety.

[Formula 2a]

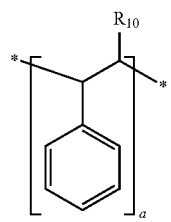

In Formula 2a, $R_{10}$ is one selected from the group consisting of hydrogen and a substituted or unsubstituted alkyl group having 1 to 5 carbon atoms, and a is an integer of 1 to 50. The integer a may preferably be an integer of 1 to 40, and more preferably an integer of 1 to 30.

Meanwhile, the first repeating unit is derived from a styrene monomer, and does not easily volatilized due to its relatively high boiling point. Thus, when a gel polymer electrolyte is formed by constituting a polymer network using both the first oligomer and the second oligomer including the first repeating unit, high-temperature safety may be improved compared to the case in which only one type oligomer is used.

In addition, the second oligomer may further include at least one repeating unit selected from the group consisting of a second repeating unit and a third repeating unit.

The second repeating unit is a repeating unit containing a cyano group (—CN), and the cyano group is a hydrophilic group having multiple bonds and coordinated with a lithium cation. Thus, the polarity of an oligomer and a gel polymer electrolyte including the same may be controlled, and the performance of the battery may be improved by enhancing the ionic conductivity by inducing an increase in dielectric constant, thereby improving battery performance.

The second repeating unit may be represented by Formula 2b below.

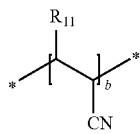

[Formula 2b]

In Formula 2b, $R_{11}$ is one selected from the group consisting of hydrogen and a substituted or unsubstituted alkyl group having 1 to 5 carbon atoms, and b is an integer of 1 to 50. The integer b may preferably be an integer of 1 to 40, and more preferably an integer of 1 to 30.

The third repeating unit is a repeating unit containing a carbon-carbon double bond (—C=C—), via the interaction with the lithium ion, an ion transfer path may be secured in the gel polymer electrolyte containing the third repeating unit, thereby improving the conductivity. In addition, a second oligomer containing a third repeating unit may be more rigidly connected to a first oligomer, and may improve the physical strength of a formed finally gel polymer electrolyte.

The third repeating unit may be represented by Formula 2c below.

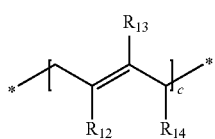

[Formula 2c]

In Formula 2c, $R_{12}$, $R_{13}$, and $R_{14}$ are each independently one selected from the group consisting of hydrogen and a substituted or unsubstituted alkyl group having 1 to 5 carbon atoms, and c is an integer of 1 to 50. The integer c may preferably be an integer of 1 to 40, and more preferably an integer of 1 to 30.

For example, the second oligomer may include at least one selected from the group consisting of units represented by Formulae 2-1 and 2-2 below.

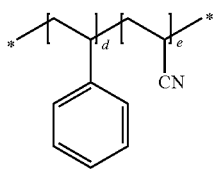

[Formula 2-1]

In Formula 2-1, d and e are each independently an integer of 1 to 50. The integers d and e may each independently be preferably an integer of 1 to 40, and more preferably an integer of 1 to 30.

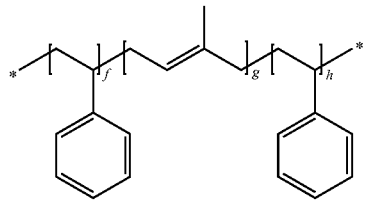

[Formula 2-2]

In Formula 2-2, f, g, and h are each independently an integer of 1 to 50. The integers f, g, and h may each independently be preferably an integer of 1 to 40, and more preferably an integer of 1 to 30.

The weight-averaged molecular weight (Mw) of the second oligomer may be controlled by the combining ratio of the first repeating unit, the second repeating unit and the third repeating unit, and the number in each repeating units constituting the second oligomer, and may be about 300 to 10,800, specifically 500 to 10,800, more specifically 1,000 to 10,800. When the weight-averaged molecular weight of the second oligomer is within the above range, the viscosity and ionic conductivity of a gel polymer electrolyte including the second oligomer are maintained at a certain level, and thus the electrochemical safety and high-temperature safety of the gel polymer electrolyte including the same may be improved Meanwhile, with respect to 100 parts by weight of a composition for a gel polymer electrolyte, the second oligomer may be included in an amount of 0.5 to 20 parts by weight, preferably 1.0 to 20 parts by weight, and more preferably 1.5 to 20 parts by weight. When the content of the second oligomer is less than 0.5 parts by weight, a network reaction between the first oligomers or with the second oligomer for forming the gel polymer electrolyte is difficult to be formed; and when the content of the second oligomer is greater than 20 parts by weight, the viscosity of the gel polymer electrolyte may exceed a certain level, which decreases impregnability, wetting property, and electrochemical stability of the battery.

Polymerization Initiator

Next, the polymerization initiator will be explained.

The polymerization initiator is for polymerizing the oligomer of the present invention to form a polymer network configured in a three-dimensional structure, and conventional polymerization initiator known in the art may be used without limitation. A photopolymerization initiator or a thermal polymerization initiator may be used as the polymerization initiator depending on the polymerization method.

Specifically, representative examples of the photopolymerization initiator may include at least one selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2[2-hydroxyethoxy]-ethyl ester, alpha-dimethoxy-alpha-phenyl acetophenone, 2-benzyl-2-(dimethylamino)-1-[4-(4-morpholinyl)phenyl]-1-butanone, 2-methyl-1-[4-(methylthio) phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadien-1-yl), bis[2,6-difluoro-3-(1H-pyrrol-1-yl)

phenyl]titanium, 4-isobutylphenyl-4'-methylphenyl iodonium, hexafluorophosphate, and methyl benzoylformate.

In addition, representative examples of the thermal polymerization initiator may include at least one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methyl-butyronitrile), 2,2'-azobis(iso-butyronitrile) (AIBN) and 2,2'-azobisdimethyl-valeronitrile (AMVN).

The polymerization initiator may be decomposed in a battery by heat at a temperature of 30° C. to 100° C. or by light such as UV light at room temperature (5° C. to 30° C.) to form radicals, and may form cross-linking by free radical polymerization thereby allowing oligomers to be polymerized.

Meanwhile, with respect to 100 parts by weight of a first oligomer and a second oligomer, the polymerization initiator may be used in an amount of 0.01 to 5 parts by weight, preferably 0.05 to 5 parts by weight, and more preferably 0.1 to 5 parts by weight. When the content of a polymerization initiator is used within the range, the amount of an unreacted polymerization initiator which may adversely affect battery performance may be minimized. In addition, when the polymerization initiator is included within the above range, gelation may be appropriately performed.

Lithium Salt

Next, the lithium salt will be explained.

The lithium salt is used as an electrolyte salt in a lithium secondary battery, and is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and preferably, may include $LiPF_6$, but is not limited thereto.

Meanwhile, the lithium salt may be included in an amount of 0.5 to 5 M, and preferably 0.5 to 4 M. When the content of the lithium salt is less than the above range, charging and discharging of the battery may not be performed properly; and when the content of the lithium salt exceeds the above range, the viscosity of the gel polymer electrolyte may be increased and wetting property in the battery may be deteriorated, thereby degrading battery performance.

Non-Aqueous Solvent

Next, the non-aqueous solvent will be explained.

In the present invention, a non-aqueous solvent is an electrolyte solvent, which is commonly used in a lithium secondary battery, and, as the non-aqueous solvent, for example, an ether, an ester (acetates, propionates), an amide, a linear carbonate or a cyclic carbonate, and a nitrile (acetonitrile, SN, etc.), may be used in a mixture of at least two thereof or alone.

Among them, a carbonate-based electrolyte solvent including a cyclic carbonate, a linear carbonate or a carbonate compound which is a mixture thereof, may be used representatively.

Specific examples of the cyclic carbonate compound are a single compound or a mixture including at least two compounds selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. In addition, as particular examples of the linear carbonate compound, a compound or a mixture including at least two compounds selected from the group consisting of dimethyl carbonate (DMC), diethyl carbonate (DEC), dipropyl carbonate (DPC), ethylmethyl carbonate (EMC), methylpropyl carbonate, and ethyl propyl carbonate (EPC), may representatively be used, but is not limited thereto.

Particularly, among the carbonate-based electrolyte solvents, propylene carbonate and ethylene carbonate, which are cyclic carbonates, are organic solvents having high viscosity, and have a high dielectric constant and cause lithium salts in an electrolyte to be dissociated well, and therefore, the propylene carbonate and the ethylene carbonate may preferably be used. In addition, when a linear carbonate, such as ethyl methyl carbonate, diethyl carbonate or dimethyl carbonate, having low viscosity and low dielectric constant, is mixed and used in an appropriate amount with the cyclic carbonate, an electrolyte having a high electrical conductivity may be obtained, and therefore, the propylene carbonate and ethylene carbonate may be more preferably used.

In addition, among the electrolyte solvents, the ester may employ a single compound or a mixture including at least two selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, but is not limited thereto.

Other than the components described above, the composition for a gel polymer electrolyte according to an embodiment of the present invention may optionally further include other additives, inorganic particles, and the like, which are capable of achieving properties known in the art, in order to impart effects of increasing the efficiency of polymer network formation reaction of the oligomer and decreasing resistance.

As the other additives, for example, additives such as vinylene carbonate (VC), vinyl ethylene carbonate (VEC), propane sultone (PS), succinonitrile (SN), adiponitrile (AdN), ethylene sulfate (ESa), propene sultone (PRS), fluoroethylene carbonate (FEC), $LiPO_2F_2$, lithium difluorooxalatoborate (LiODFB), lithium bis-(oxalato)borate (LiBOB), 3-trimethoxysilanyl-propyl-N-aniline (TMSPa), tris(trimethylsilyl) phosphite (TMSPi), and $LiBF_4$ are applicable.

In addition, as the inorganic particles, a single compound or a mixture including at least two selected from the group consisting of $BaTiO_3$ having dielectric constant of 5 or more, $BaTiO_3$, $Pb(Zr,Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, may be used.

Besides the listed above, inorganic particles having lithium ion transfer ability, for example, a lithium phosphate ($Li_3PO_4$), a lithium titanium phosphate ($Li_cTi_d(PO4)3$, $0<d<2$, $0<d<3$), a lithium aluminum titanium phosphate ($Li_{a1}Al_{b1}Ti_{c1}(PO_4)_3$, $0<a1<2$, $0<b1<1$, $0<c1<3$), $(LiAlTiP)_{a2}O_{b2}$-based glass ($0<a2<4$, $0<b2<13$) such as $14Li_2O$-$9Al_2O_3$-$38TiO_2$-$39P_2O_5$, a lithium lanthanum titanate ($Li_{a3}La_{b3}TiO_3$, $0<a3<2$, $0<b3<3$), a lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, a lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c4<4$) such as $Li_3PO_4$—

Li$_2$S—SiS$_2$, P$_2$S$_5$-based glass (Li$_{a7}$P$_{b7}$S$_{c5}$, 0<a7<3, 0<b7<3, 0<c5<7) such as LiI—Li$_2$S—P$_2$S$_5$, or a mixture thereof, may be used.

Gel Polymer Electrolyte

Hereinafter, a gel polymer electrolyte according to the present invention will be explained.

According to an embodiment of the present invention, a gel polymer electrolyte is prepared using the composition for a gel polymer electrolyte.

The conventional gel polymer electrolyte has a problem that the ionic conductivity thereof is lower than a liquid electrolyte, and the stability and mechanical properties thereof are relatively poor when compared with a solid polymer electrolyte.

However, in the gel polymer electrolyte according to the present invention, a polymer network is formed using a first oligomer including unit A including a (meth)acrylate group, units B and B' each independently including an amide group, units C and C' each independently including an oxyalkylene group, and unit D including a siloxane group, and a second oligomer including a first repeating unit derived from a styrene monomer, to allow ionic conductivity and mechanical properties to be improved, and high-temperature safety to be also improved due to low volatility.

Meanwhile, the gel polymer electrolyte according to the present invention is formed by polymerizing a composition for a gel polymer electrolyte according to a commonly known method in the art. Generally, a gel polymer electrolyte may be prepared through in-situ polymerization or coating polymerization.

More specifically, in-situ polymerization is a method of preparing a gel polymer through step (a) for inserting, into a battery case, an electrode assembly composed of a positive electrode, a negative electrode, and a separator disposed between the positive electrode and the negative electrode, and step (b) injecting, into the battery case, the composition for a gel polymer electrolyte according to the present invention and then polymerizing the resultant composition.

The in-situ polymerization reaction in a lithium secondary battery is possible via E-beam, γ-rays, and room temperature/high temperature aging process, and according to an embodiment of the present invention, the in-situ polymerization may be performed by thermal polymerization or photopolymerization. In particular, a polymerization time takes approximately 2 minutes to approximately 12 hours, a thermal polymerization temperature may be 30° C. to 100° C., and a photopolymerization temperature may be a room temperature (5° C. to 30° C.).

More specifically, the in-situ polymerization reaction in a lithium secondary battery is performed to form a gel polymer electrolyte by injecting the composition for a gel polymer electrolyte into a battery cell, and then subjecting to gelation via polymerization reaction.

As another method, the gel polymer electrolyte may be prepared in such a way that surfaces of an electrode and a separator are coated with the composition for a gel polymer electrolyte, is hardened (gelated) using heat or light such as ultraviolet (UV) light, an electrode assembly is then prepared by winding or stacking an electrode and/or a separator on which a gel polymer electrolyte is formed, the electrode assembly is inserted into a battery case, and a conventional liquid electrolyte is re-injected thereinto.

Lithium Secondary Battery

Next, the lithium secondary battery according to the present invention will be explained. A secondary battery according to another embodiment of the present invention includes a negative electrode, a positive electrode, a separator disposed between the positive electrode and the negative electrode, and a gel polymer electrolyte. The gel polymer electrolyte is the same as described above, and particular explanation thereof will be omitted.

Positive Electrode

The positive electrode may be prepared by coating a positive electrode current collector with a positive electrode mixture slurry including a positive electrode active material, a binder, a conductive agent, a solvent, or the like.

The positive electrode current collector is not particularly limited so long as having conductivity without causing chemical changes in the battery, and, for example, may employ stainless steel, aluminum, nickel, titanium, fired carbon, or aluminum or stainless steel that is surface-treated with carbon, nickel, titanium, silver, or the like.

The positive electrode active material is a compound capable of reversibly intercalating and deintercalating lithium, and may particularly include a lithium composite metal oxide including lithium and one or more metals such as cobalt, manganese, nickel and aluminum. More specifically, the lithium composite metal oxide may be a lithium-manganese-based oxide (e.g., LiMnO$_2$, LiMn$_2$O$_4$, etc.), a lithium-cobalt-based oxide (e.g., LiCoO$_2$, etc.), a lithium-nickel-based oxide (e.g., LiNiO$_2$, etc.), a lithium-nickel-manganese-based oxide (e.g., LiNi$_{1-Y1}$Mn$_{Y1}$O$_2$ (where 0<Y1<1), LiMn$_{2-Z1}$Ni$_{z1}$O$_4$ (where 0<Z1<2), etc.), a lithium-nickel-cobalt-based oxide (e.g., LiNi$_{1-Y2}$Co$_{Y2}$O$_2$ (where 0<Y2<1), etc.), a lithium-manganese-cobalt-based oxide (e.g., LiCo$_{1-Y3}$Mn$_{Y3}$O$_2$ (where 0<Y3<1), LiMn$_{2-Z2}$Co$_{Z2}$O$_4$ (where 0<Z2<2), etc.), a lithium-nickel-manganese-cobalt-based oxide (e.g., Li(Ni$_{p1}$Co$_{q2}$Mn$_{r1}$)O$_2$ (where 0<p1<1, 0<q1<1, 0<r1<1, and p1+q1+r1=1), Li(Ni$_{p2}$Co$_{q2}$Mn$_{r2}$)O$_4$ (where 0<p2<2, 0<q2<2, 0<r2<2, p2+q2+r2=2), etc.), or lithium-nickel-cobalt-transition metal (M) oxide (e.g., Li(Ni$_{p3}$Co$_{q3}$Mn$_{r3}$M$_{S1}$)O$_2$ (where M is selected from the group consisting of Al, Fe, V, Cr, Ti, Ta, Mg and Mo, and p3, q3, r3 and s1 are atomic fractions of each independent elements, wherein 0<p3<1, 0<q3<1, 0<r3<1, 0<s1<1, and p3+q3+r3+s1=1), etc.), and may include any one thereof or a compound of two or more thereof.

Among the above-listed compounds, in terms of increasing the capacity characteristics and stability of a battery, the lithium composite metal oxide may be LiCoO$_2$, LiMnO$_2$, LiNiO$_2$, a lithium nickelmanganesecobalt oxide (e.g., Li(Ni$_{0.6}$Mn$_{0.2}$Co$_{0.2}$)O$_2$, Li(Ni$_{0.5}$Mn$_{0.3}$Co$_{0.2}$)O$_2$, or Li(Ni$_{0.8}$Mn$_{0.1}$Co$_{0.1}$)O$_2$, etc.), or a lithium nickelcobaltaluminum oxide (e.g., LiNi$_{0.8}$Co$_{0.15}$Al$_{0.05}$O$_2$, etc.), or the like, and when considering that the remarkably improved effect according to the control of the types and content ratio of constituent elements which form the lithium composite metal oxide, the lithium composite metal oxide may be Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.5}$Co$_{0.15}$)O$_2$ or Li(Ni$_{0.8}$Mn$_{0.1}$Co$_{0.1}$)O$_2$, or the like, and may include any one thereof or a mixture of two or more thereof.

The positive electrode active material may be included in an amount of 60 to 98 wt %, preferably 70 to 98 wt %, and more preferably 80 to 98 wt %, based on the total weight of the solid content of the positive electrode mixture slurry excluding the solvent.

The binder is a component that assists in binding between the active material and the conductive agent, etc. and in binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, various copolymers, and the like.

Typically, the binder may be included in an amount of 1 to 20 wt %, preferably 1 to 15 wt %, and more preferably 1 to 10 wt %, based on the total weight of the solid content of the positive electrode mixture slurry excluding the solvent.

The conductive agent is a component for further improving conductivity of the positive electrode active material.

Any conductive agent, so long as having a conductivity without causing chemical changes in the battery, may be used without particular limitation, and may employ, for example, a conductive material, such as: graphite; carbon-based materials such as carbon black, acetylene black, Ketjen Black™, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives. Specific examples of a commercially available conductive agent include acetylene black-based products such as Chevron Chemical Company or Denka Black™ (Denka Singapore Private Limited), Gulf Oil Company, Ketjen Black™, EC-based (Armak Company products), Vulcan XC-72™(Cabot Company products), and Super P™ (Timcal Co. products).

The conductive agent may be commonly included in an amount of 1 to 20 wt %, preferably 1 to 15 wt %, and more preferably 1 to 10 wt %, based on the total weight of the solid content of the positive electrode mixture slurry excluding the solvent.

The solvent may include an organic solvent such as N-methyl-2-pyrrolidone (NMP), and may be used in an amount satisfying a desirable viscosity when the positive electrode active material, and an optional binder and the conductive agent are included. For example, the solvent may be included such that the concentration of the solid content, which includes the positive electrode active material, and the optionally included binder and conductive agent, may be 50 to 95 wt %, preferably 70 to 95 wt %, and more preferably 70 to 90 wt %.

Negative Electrode

The negative electrode may be produced by coating a negative electrode current collector with a negative electrode mixture slurry including a negative electrode active material, a binder, a conductive agent and a solvent, or may use a graphite electrode consisting of carbon (C) or a metal itself.

For example, when the negative electrode current collector is coated with the negative electrode mixture slurry, the negative electrode current collector generally has a thickness of 3 to 500 The negative electrode current collector is not particularly limited as long as it has a high conductivity without causing chemical changes in the battery, and may use, for example, copper, stainless steel, aluminum, nickel, titanium, fired carbon, copper or stainless steel which is surface-treated with carbon, nickel, titanium, silver, or the like, an aluminum-cadmium alloy, or the like. In addition, as in the positive electrode current collector, the negative electrode current collector may have fine irregularities on the surface thereof to improve the bonding strength of a negative electrode active material, and the negative electrode current collector may be used in various shapes such as a film, a sheet, a foil, a net, a porous body, a foam body, and a non-woven fabric body.

The negative electrode active material may be, for example, one kind or at least two kinds selected from the group consisting of natural graphite, artificial graphite, a carbonaceous material; a lithium-containing titanium composite oxide (LTO), metals (Me): Si, Sn, Li, Zn, Mg, Cd, Ce, Ni or Fe; an alloy of the metals (Me); an oxide (MeOx) of the metals (Me); and a complex of the metals (Me) and carbon.

The negative electrode active material may be included in an amount of 60 to 98 wt %, preferably 70 to 98 wt %, and more preferably, 80 to 98 wt %, based on a total solid content of the negative electrode mixture slurry excluding the solvent.

The binder is a component that assists in binding between a conductive agent, an active material, and a current collector. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and various copolymers thereof.

The binder may be commonly included in an amount of 1 to 20 wt %, preferably 1 to 15 wt %, and more preferably 1 to 10 wt %, based on the total weight of the solid content of the negative electrode mixture slurry excluding the solvent.

The conductive agent is a component for further improving the conductivity of the negative electrode active material. The conductive agent is not particularly limited as long as it has a conductivity without causing chemical changes in the battery, and may use, for example, a conductive agent, such as: graphite such as natural graphite and artificial graphite; carbon black such as acetylene black, Ketjen black™, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; a conductive metal oxide such as titanium oxide; or polyphenylene derivatives.

The conductive agent may be included in an amount of 1 to 20 wt %, preferably 1 to 15 wt %, and more preferably 1 to 10 wt %, based on the total weight of the solid content of the negative electrode mixture slurry excluding the solvent.

The solvent may include water or an organic solvent, such as N-methyl-2-pyrrolidone (NMP), and may be used in an amount satisfying a desirable viscosity when the negative electrode active material, and an optional binder and conductive agent are included. For example, the solvent may be included such that the concentration of the solid content including a negative electrode active material, and the optionally included binder and a conductive agent, may be 50 to 95 wt %, preferably 70 to 90 wt %.

When metal itself is used as the negative electrode, the negative electrode may be formed from a metal thin film itself or prepared by physically bonding, rolling or vapor depositing the metal on the negative electrode current collector. Electro deposition or chemical vapor deposition may be used as a deposition technique.

For example, the metal thin film itself or a metal formed on the negative electrode current collector through binding/ rolling/depositing may include one metal or an alloy of two metals selected from the group consisting of lithium (Li), nickel (Ni), tin (Sn), copper (Cu), and indium (In).

Separator

In addition, a separator may use a typically used porous polymer film, which is conventionally used as a separator. The separator may use, alone or in a laminated form, a porous polymer film formed from, for example, a polyolefin-based polymer, such as an ethylene homopolymer, a propylene homopolymer, an ethylene/butene copolymer, an ethylene/hexene copolymer, and an ethylene/methacrylate copolymer, or may use a typical porous non-woven fabric, for example, a non-woven fabric formed of high-melting-point glass fibers, or polyethylene terephthalate fibers. However, the separator is not limited thereto.

The outer shape of the lithium secondary battery of the present invention is not particularly limited, and thus a cylindrical shape using a can, a prismatic shape, a pouch shape, or a coin shape, may be used.

According to another example of the present invention, a battery module including the lithium secondary battery as a unit cell and a battery pack including the same, are provided. The battery module and the battery pack include the secondary battery having high capacity, high rate capability characteristics, and high cycle characteristics, and may thus be used as a power source of medium- to large-sized devices including an electric vehicle, a hybrid electric vehicle, a plug-in hybrid electric vehicle, and a power storage system.

MODE FOR CARRYING OUT THE INVENTION

Hereinafter, the present invention will be described in more detail through the particular examples. However, the examples below are only for helping the understanding of the present invention and should not be construed to limit the scope of the present invention. It would be obvious to a person skilled in the art that various changes and modifications are possible within the scope of this description and the technical spirit and such changes and modifications definitely are included in the scope of the attached claims.

EXAMPLES

1. Example 1

(1) Preparation of Composition for Gel Polymer Electrolyte

A composition for a gel polymer electrolyte was prepared by mixing ethylene carbonate (EC) and ethyl methyl carbonate (EMC) at a volume ratio of 3:7, adding 0.7 M of $LiPF_6$ and 0.5 M of LiFSI to prepare a mixed solvent, and then adding, into 100 g of the prepared mixed solvent, 2.5 g of the oligomer represented by Formula 1-5 (weight-averaged molecular weight of 5,000), 2.5 g of the oligomer represented by Formula 2-1 (weight-averaged molecular weight of 3,000), 0.02 g of a polymerization initiator (AIBN), and, as other additives, 1.5 g of VC, 0.5 g of PS, and 1 g of ESa.

(2) Manufacture of Lithium Secondary Battery

A positive electrode mixture slurry was prepared by adding, into N-methyl-2-pyrrolidone (NMP) as a solvent, 97.5 wt % of ($LiNi_{0.8}Co_{0.1}Mn_{0.1}O_2$; NCM) as a positive electrode active material, 1.5 wt % of carbon black as a conductive agent, and 1 wt % of PVDF as a binder. An aluminum (Al) thin film having a thickness of about 20 µm, as a positive electrode current collector, was coated with the positive electrode mixture slurry and dried, and then roll-pressed to prepare a positive electrode.

In addition, an artificial graphite electrode was used as a negative electrode.

An electrode assembly was prepared using the positive electrode, the negative electrode, and a separator formed of three layers of polypropylene/polyethylene/polypropylene (PP/PE/PP), the prepared composition for a gel polymer electrolyte was injected into the electrode assembly, the resultant mixture was left standing for 2 days, and the battery was heated at 60° C. for 24 hours to prepare a lithium secondary battery including the gel polymer electrolyte.

2. Example 2

A lithium secondary battery including a gel polymer electrolyte was manufactured in the same manner as in Example 1 except that 2 g of the compound represented by Formula 2-1 was added unlike Example 1.

3. Example 3

A lithium secondary battery including a gel polymer electrolyte was manufactured in the same manner as in Example 1 except that, as a second oligomer, 3 g of the oligomer represented by Formula 2-1 and 3 g of the oligomer represented by Formula 2-2 were added unlike Example 1.

4. Example 4

A lithium secondary battery including a gel polymer electrolyte was manufactured in the same manner as in Example 1 except that 2 g of the oligomer represented by Formula 2-2 was added unlike Example 3.

5. Example 5

A lithium secondary battery including a gel polymer electrolyte was manufactured in the same manner as in Example 1 except that, as a second oligomer, 1.5 g of the oligomer represented by Formula 2-1 and 1.5 g of the oligomer represented by Formula 2-2 were added unlike Example 1.

COMPARATIVE EXAMPLES

1. Comparative Example 1

(1) Preparation of Electrolyte

An electrolyte was prepared using a solvent mixture obtained by mixing ethylene carbonate (EC) and ethyl methyl carbonate (EMC) at a volume ratio of 3:7, and adding 0.7 M of $LiPF_6$ and 0.5 M of LiFSI.

(2) Manufacture of Lithium Secondary Battery

A positive electrode mixture slurry was prepared by adding 97.5 wt % of $LiNi_{0.8}Co_{0.1}Mn_{0.1}O_2$ (NCM) as a positive electrode active material, 1.5 wt % of carbon black as a conductive agent, and 1 wt % of PVDF as a binder, to N-methyl-2-pyrrolidone (NMP) as a solvent. An aluminum (Al) thin film having a thickness of about 20 µm, as a positive electrode current collector, was coated with the positive electrode mixture slurry and dried, and then roll-pressed to prepare a positive electrode.

In addition, an artificial graphite electrode was used as a negative electrode.

A lithium secondary battery was manufactured using the positive electrode, the negative electrode, and a separator formed of three layers of polypropylene/polyethylene/polypropylene (PP/PE/PP), and the prepared electrolyte was injected into the electrode assembly.

2. Comparative Example 2

A lithium secondary battery including a gel polymer electrolyte was manufactured in the same manner as in Example 1 except that 5 g of the oligomer(weight-averaged molecular weight of 5,000) represented by Formula 1-5 was used, but the oligomer represented by Formula 2-1 was not used unlike Example 1.

3. Comparative Example 3

A lithium secondary battery including a gel polymer electrolyte was manufactured in the same manner as in Example 1 except that 5 g of the oligomer(weight-averaged molecular weight of 3000) represented by Formula 2-1 was used, but the oligomer represented by Formula 1-5 was not used unlike Example 1.

4. Comparative Example 4

A lithium secondary battery including a gel polymer electrolyte was manufactured in the same manner as in Example 1 except that an acrylate-based oligomer composed of dipentaerythritol pentaacrylate was used as an oligomer, instead of the oligomer of Formula 1-5 and the oligomer of Formula 2-1, unlike Example 1.

EXPERIMENTAL EXAMPLES

1. Experimental Example 1: Evaluation of High-Temperature Safety (Measurement of Amount of Heat Generated)

Lithium secondary batteries manufactured according to Examples 1-5 and Comparative Examples 1-4 were charged to SOC of 100% under the condition of a voltage of 4.25 V. Thereafter, the temperature was raised at a heating rate of 0.7° C./min from 25° C., and the temperature was maintained for about 100 minutes in a temperature range of about 120° C. (first temperature maintaining section). Thereafter, the temperature was raised again at a heating rate of 0.7° C./min and maintained in a temperature range of about 150° C. (second temperature maintaining section). Thereafter, the temperature was raised again at a heating rate of 0.7° C./min and maintained in a temperature range of about 200° C. (third temperature maintaining section), the lithium secondary battery was subsequently exposed at high temperature, and thereafter, the amount of heat generated of the inside of the lithium secondary battery was measured (measured by a multi module calorimeter (MMC) 274 of NETZSCH Co., Ltd.), and the results thereof are presented in Table 1 below.

TABLE 1

|  | Amount of heat generated (J/g) in the second temperature maintaining section | Amount of heat generated (J/g) in the third temperature maintaining section |
| --- | --- | --- |
| Example 1 | 50 | 100 |
| Example 2 | 60 | 105 |
| Example 3 | 45 | 95 |

TABLE 1-continued

|  | Amount of heat generated (J/g) in the second temperature maintaining section | Amount of heat generated (J/g) in the third temperature maintaining section |
| --- | --- | --- |
| Example 4 | 60 | 107 |
| Example 5 | 70 | 120 |
| Comparative Example 1 | 580 | 1020 |
| Comparative Example 2 | 150 | 210 |
| Comparative Example 3 | 140 | 205 |
| Comparative Example 4 | 505 | 950 |

An amount of heat generated was not observed in the first temperature maintaining section in the Examples and the Comparative Examples. It can be ascertained that the batteries prepared according to the Examples exhibit small amounts of heat generated in both the second and third temperature maintaining sections, whereas the batteries prepared according to the Comparative Examples exhibit remarkably large amounts of heat generated in both the second and third temperature maintaining sections.

2. Experimental Example 2: Evaluation of High-Temperature Safety (Measurement of Amount of Gas in Battery)

Lithium secondary batteries prepared according to Examples 1-5 and Comparative Examples 1-4 were charged to SOC of 100% under the condition of a voltage of 4.25 V. The batteries were exposed at 60° C. for 10 weeks, and then the amount of gas generated in the lithium secondary batteries was measured and presented in Table 2 below.

TABLE 2

|  | Gas amount (ml) after storage at 60° C. for 10 weeks |
| --- | --- |
| Example 1 | 150 |
| Example 2 | 155 |
| Example 3 | 125 |
| Example 4 | 150 |
| Example 5 | 170 |
| Comparative Example 1 | 1050 |
| Comparative Example 2 | 290 |
| Comparative Example 3 | 250 |
| Comparative Example 4 | 305 |

If a lithium secondary battery is charged and exposed at high temperature for a long time, carbon monoxide (CO), and carbon dioxide ($CO_2$) gases, which are products generated by decomposition of the gel polymer electrolyte, are produced. It can be ascertained that less gas is generated in the batteries prepared according to the Examples using the gel polymer electrolyte than in the batteries using a liquid electrolyte (Comparative Example 1).

In addition, it can be ascertained that less gas is generated in the lithium secondary batteries prepared according to the Examples using two types of oligomers in combination than in the batteries of using only one type of oligomer. It seems that this is because when the oligomers having different molecular weights are mixed, the gel polymer is formed more stably, and the characteristics of the polymer (such as suppression of volatility) are expressed.

The invention claimed is:

1. A composition for a gel polymer electrolyte, the composition comprising:
   a first oligomer represented by Formula 1;
   a second oligomer comprises a unit represented by Formula 2-1;
   a polymerization initiator;
   a lithium salt; and
   a non-aqueous solvent,

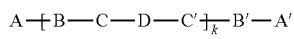
   [Formula 1]

wherein, in Formula 1,
   A and A' are each independently a unit including a (meth)acrylate group,
   B and B' are each independently a unit including an amide group,
   C and C' are each independently a unit including an oxyalkylene group,
   D is a unit including a siloxane group, and
   k is an integer of 1 to 100,

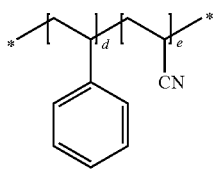
   [Formula 2-1]

wherein, in Formula 2-1, d and e are each independently an integer of 1 to 50, and
   * is a connected part between the same or different atoms or between terminal parts of Formula 2-1.

2. The composition for a gel polymer electrolyte according to claim 1, wherein the first oligomer and the second oligomer are included at a mass ratio of 97.5:2.5 to 2.5:97.5.

3. The composition for a gel polymer electrolyte according to claim 1, wherein the weight-averaged molecular weight (Mw) of the first oligomer is 1,000 to 10,000.

4. The composition for a gel polymer electrolyte according to claim 1, wherein the weight-averaged molecular weight (Mw) of the second oligomer is 300 to 10,800.

5. The composition for a gel polymer electrolyte according to claim 1, wherein A and A' each independently comprises at least one unit represented by Formulae A-1 to A-5,

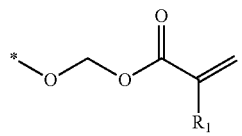
[Formula A-1]

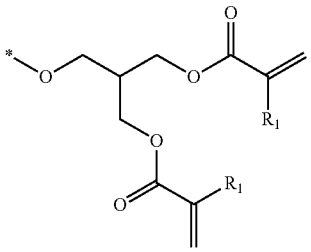
[Formula A-2]

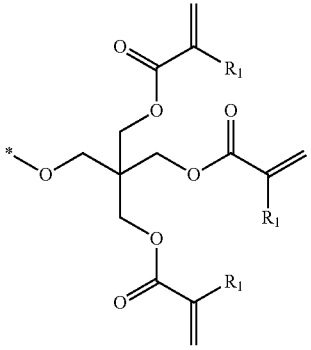
[Formula A-3]

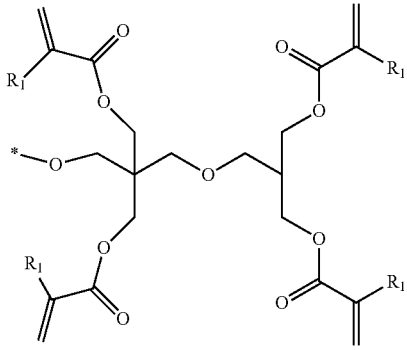
[Formula A-4]

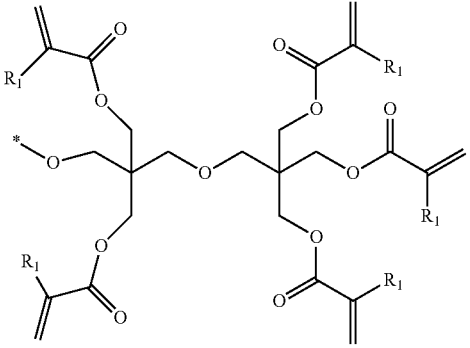
[Formula A-5]

wherein, in Formulae A-1 to A-5, $R_1$ is each independently one selected from the group consisting of hydrogen and an alkyl group having 1 to 6 carbon atoms, and
* is a connected part between the same or different atoms or between terminal parts of Formulae A-1 to A-5.

6. The composition for a gel polymer electrolyte according to claim 1, wherein the first oligomer comprises at least one compound selected from the group consisting of compound represented by Formulae 1-1 to 1-5,

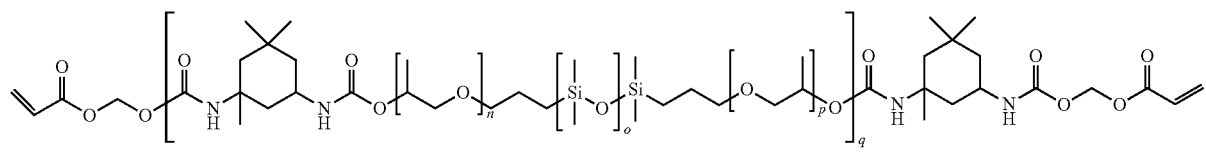
[Formula 1-1]
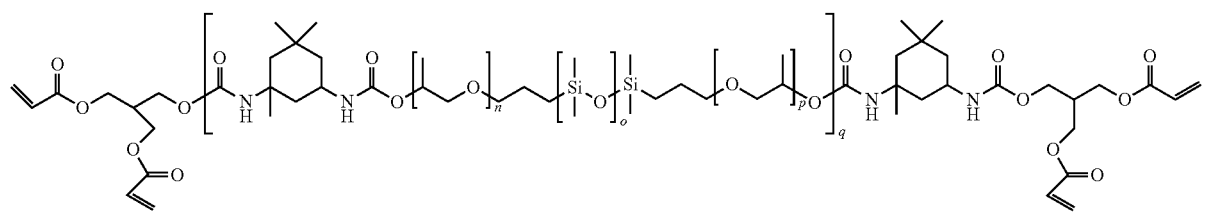
[Formula 1-2]
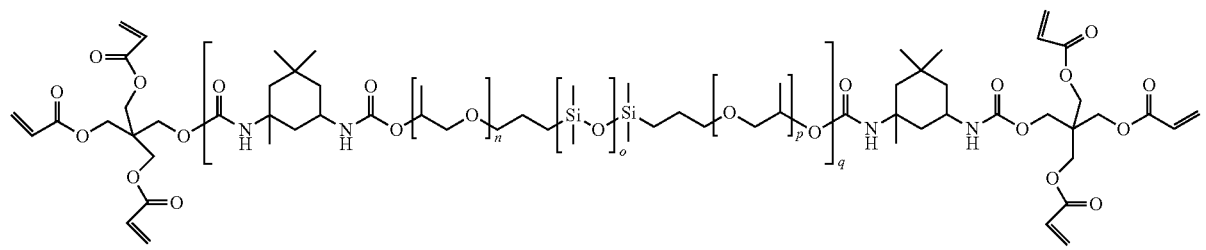
[Formula 1-3]
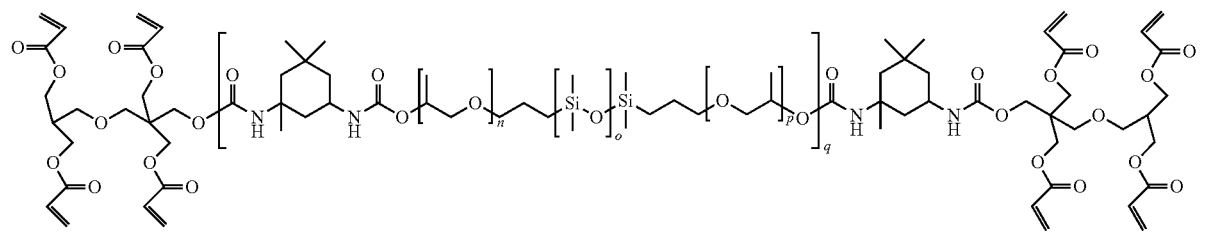
[Formula 1-4]
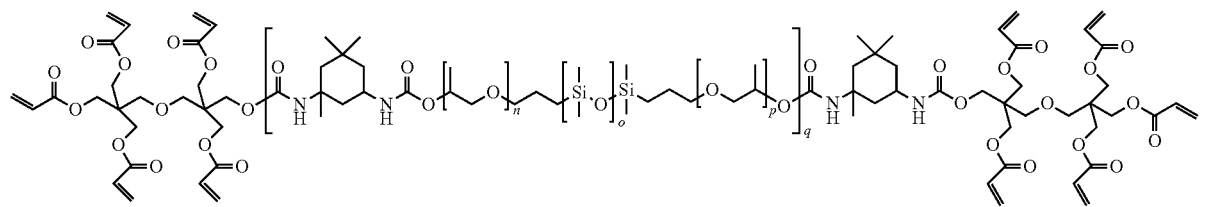
[Formula 1-5]

wherein, in Formulae 1-1 to 1-5, n, o, and p are each independently an integer of 1 to 30, and q is an integer of 1 to 100.

7. A composition for a gel polymer electrolyte, the composition comprising:
a first oligomer represented by Formula 1;
a second oligomer comprises a repeating unit represented by Formula 2c,
a polymerization initiator;
a lithium salt; and
a non-aqueous solvent,

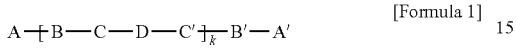

[Formula 1]

wherein, in Formula 1,
A and A' are each independently a unit including a (meth)acrylate group,
B and B' are each independently a unit including an amide group,
C and C' are each independently a unit including an oxyalkylene group,
D is a unit including a siloxane group, and
k is an integer of 1 to 100,

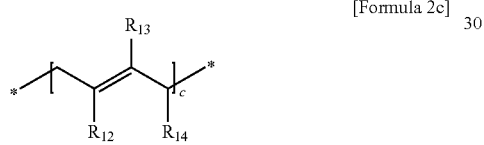

[Formula 2c]

wherein, in Formula 2c,
$R_{12}$, $R_{13}$, and $R_{14}$ are each independently one selected from the group consisting of hydrogen and an alkyl group having 1 to 5 carbon atoms, and c is an integer of 1 to 50, and
* is a connected part between the same or different atoms or between terminal parts of Formula 2c.

8. The composition for a gel polymer electrolyte according to claim 7, wherein the first oligomer and the second oligomer are included at a mass ratio of 97.5:2.5 to 2.5:97.5.

9. The composition for a gel polymer electrolyte according to claim 7, wherein the weight-averaged molecular weight (Mw) of the first oligomer is 1,000 to 10,000.

10. The composition for a gel polymer electrolyte according to claim 7, wherein the weight-averaged molecular weight (Mw) of the second oligomer is 300 to 10,800.

11. The composition for a gel polymer electrolyte according to claim 7, wherein the second oligomer comprises a unit represented by Formula 2-2,

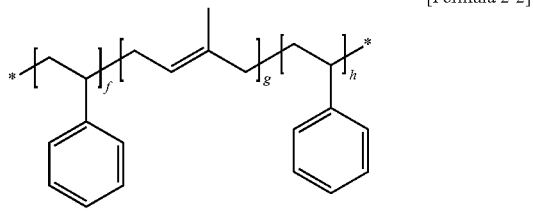

[Formula 2-2]

wherein, in Formula 2-2, f, g, and h are each independently an integer of 1 to 50, and
* is a connected part between the same or different atoms or between terminal parts of Formula 2-2.

12. The composition for a gel polymer electrolyte according to claim 7, wherein A and A' each independently comprises at least one unit represented by Formulae A-1 to A-5,

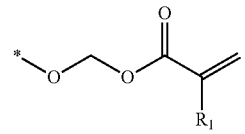

[Formula A-1]

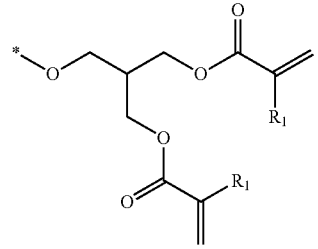

[Formula A-2]

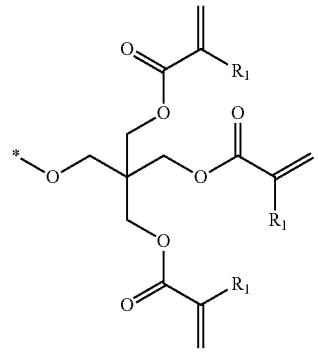

[Formula A-3]

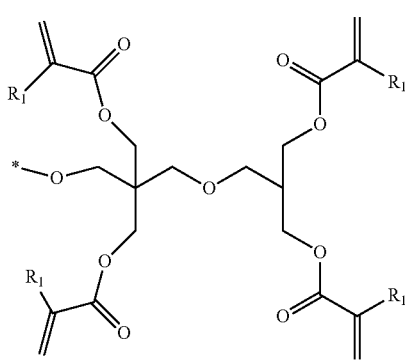

[Formula A-4]

[Formula A-5]

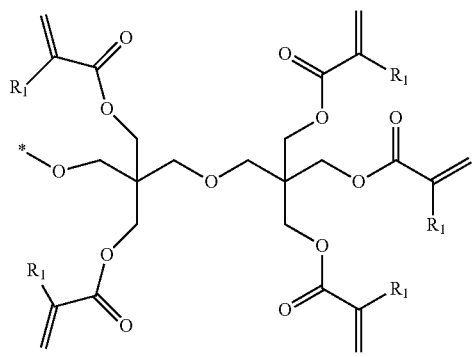

wherein, in Formulae A-1 to A-5, $R_1$ is each independently one selected from the group consisting of hydrogen and an alkyl group having 1 to 6 carbon atoms, and

* is a connected part between the same or different atoms or between terminal parts of Formula A-1 to A-5.

13. The composition for a gel polymer electrolyte according to claim 7, wherein the first oligomer comprises at least one compound selected from the group consisting of compound represented by Formulae 1-1 to 1-5,

[Formula 1-1]

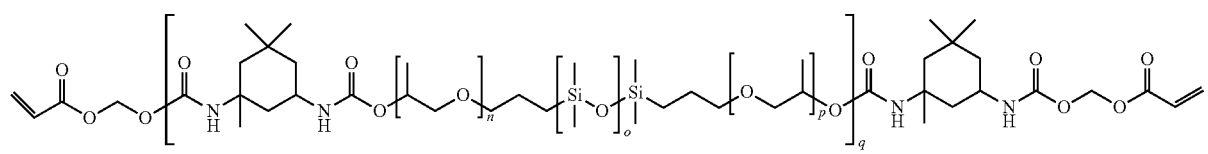

[Formula 1-2]

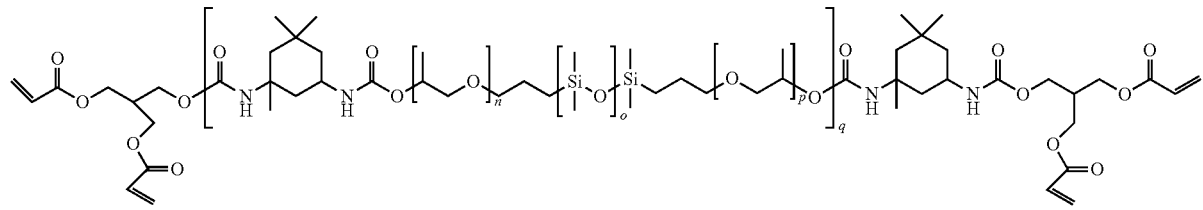

[Formula 1-3]

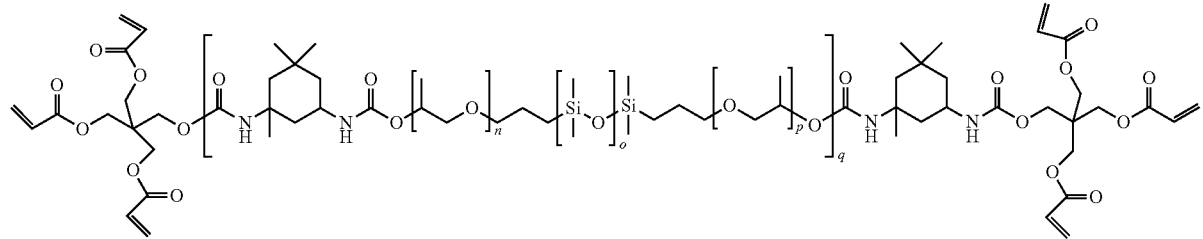

[Formula 1-4]

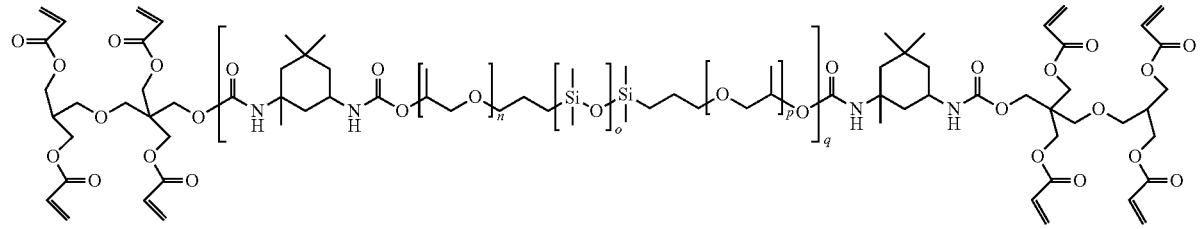

[Formula 1-5]

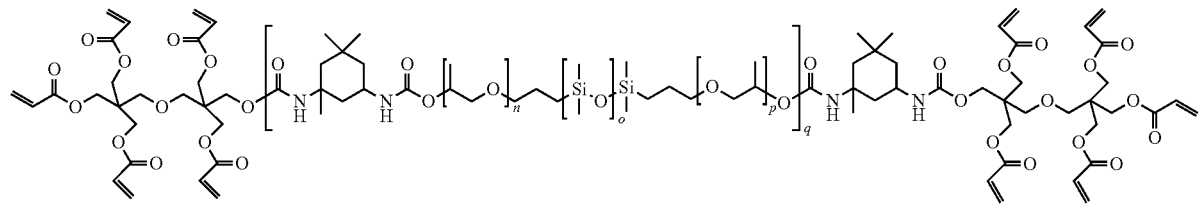

wherein, in Formulae 1-1 to 1-5, n, o, and p are each independently an integer of 1 to 30, and q is an integer of 1 to 100.

14. A gel polymer electrolyte prepared using the composition for a gel polymer electrolyte according to claim 1.

15. A lithium secondary battery comprising:
a positive electrode;
a negative electrode;
a separator disposed between the positive electrode and the negative electrode; and
the gel polymer electrolyte according to claim 9.

16. A gel polymer electrolyte prepared using the composition for a gel polymer electrolyte according to claim 7.

17. A lithium secondary battery comprising:
a positive electrode;
a negative electrode;
a separator disposed between the positive electrode and the negative electrode; and
the gel polymer electrolyte according to claim 16.

* * * * *